US008200950B2

(12) United States Patent
Okabe

(10) Patent No.: US 8,200,950 B2
(45) Date of Patent: Jun. 12, 2012

(54) SHARING PIPELINE BY INSERTING NOP TO ACCOMMODATE MEMORY ACCESS REQUEST RECEIVED FROM OTHER PROCESSORS

(75) Inventor: Motohiko Okabe, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 443 days.

(21) Appl. No.: 12/478,227

(22) Filed: Jun. 4, 2009

(65) Prior Publication Data

US 2010/0050026 A1 Feb. 25, 2010

(30) Foreign Application Priority Data

Aug. 21, 2008 (JP) ................................. 2008-213351

(51) Int. Cl.
*G06F 9/38* (2006.01)

(52) U.S. Cl. ...................... 712/225; 712/23; 712/E9.045

(58) Field of Classification Search ........................ None
See application file for complete search history.

(56) References Cited

U.S. PATENT DOCUMENTS
7,278,014 B2 * 10/2007 Erb ............................... 712/244

FOREIGN PATENT DOCUMENTS
JP 3435267 5/2003
WO WO 01/95101 A2 12/2001

OTHER PUBLICATIONS

John L. Hennessy et al., "Computer Architecture and Design (vol. 2)", Nikkei Business Publications Inc., Jun. 26, 1996, pp. 23-70.
David A. Patterson, et al., "Computer organization and design: the hardware/software interface" 2nd ed. Morgan Kaufman Publishers, Inc., 1998, pp. 489-495.
John L. Hennessy, et al., "Computer Organization and Design. Second Edition", Morgan Kaufmann Publishers, 1998, pp. 436-445 Fig. 6,4.

* cited by examiner

*Primary Examiner* — Kenneth Kim
(74) *Attorney, Agent, or Firm* — Oblon, Spivak, McClelland, Maier & Neustadt, L.L.P.

(57) ABSTRACT

A pipeline operation processor comprises a pipeline processing unit and an instruction insertion controller which inserts an instruction when access to an operation memory is requested, and corrects control information by reference to control information of stages. When a control program is in execution, on receiving an access request instruction requesting for access to the operation memory, the instruction insertion controller inserts an NOP instruction from the instruction decoding unit in place of the access request instruction. The access request instruction is executed while the pipeline processing unit executes no operation, and subsequently, the pipeline processing is continued.

8 Claims, 12 Drawing Sheets

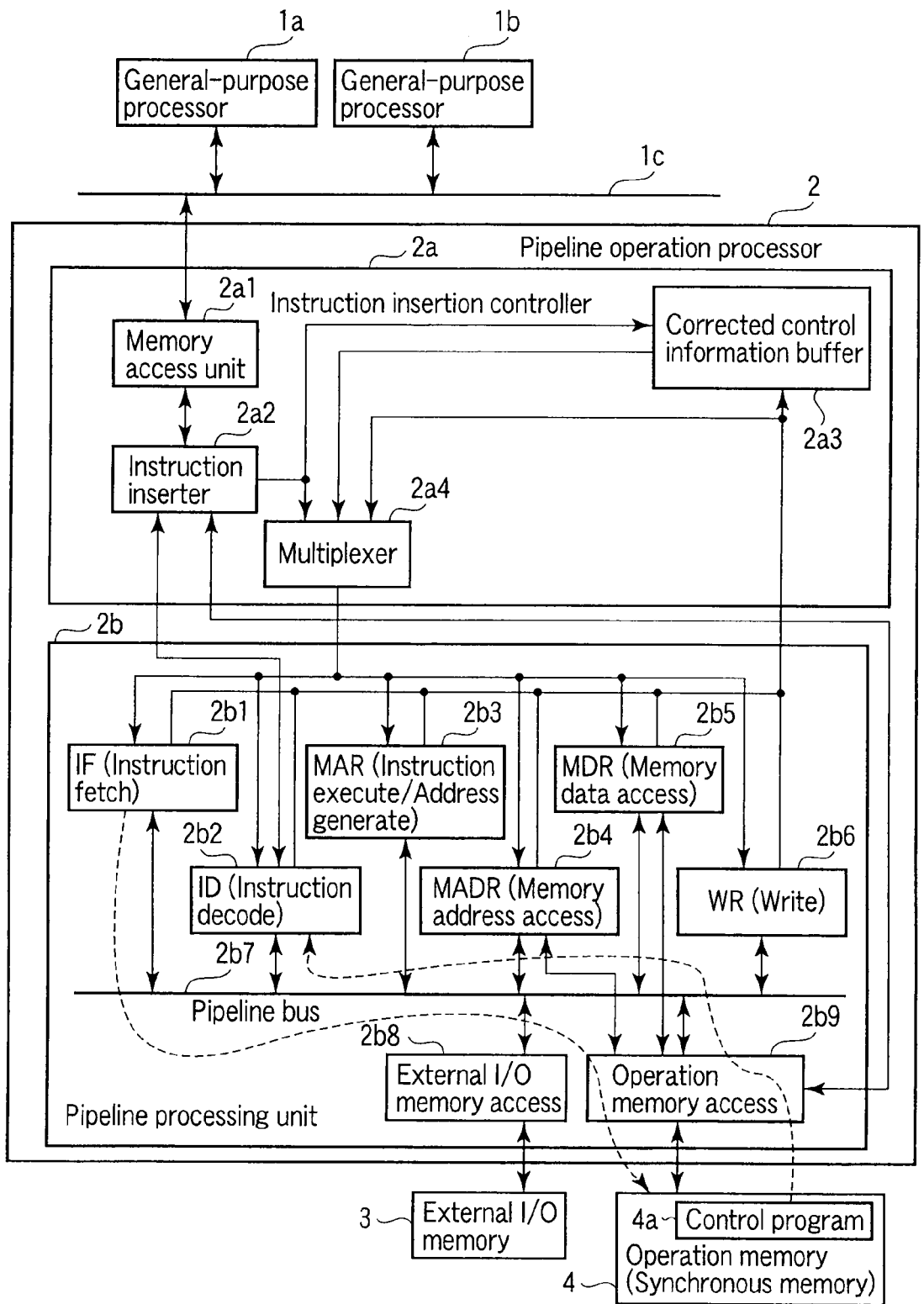
F I G. 1

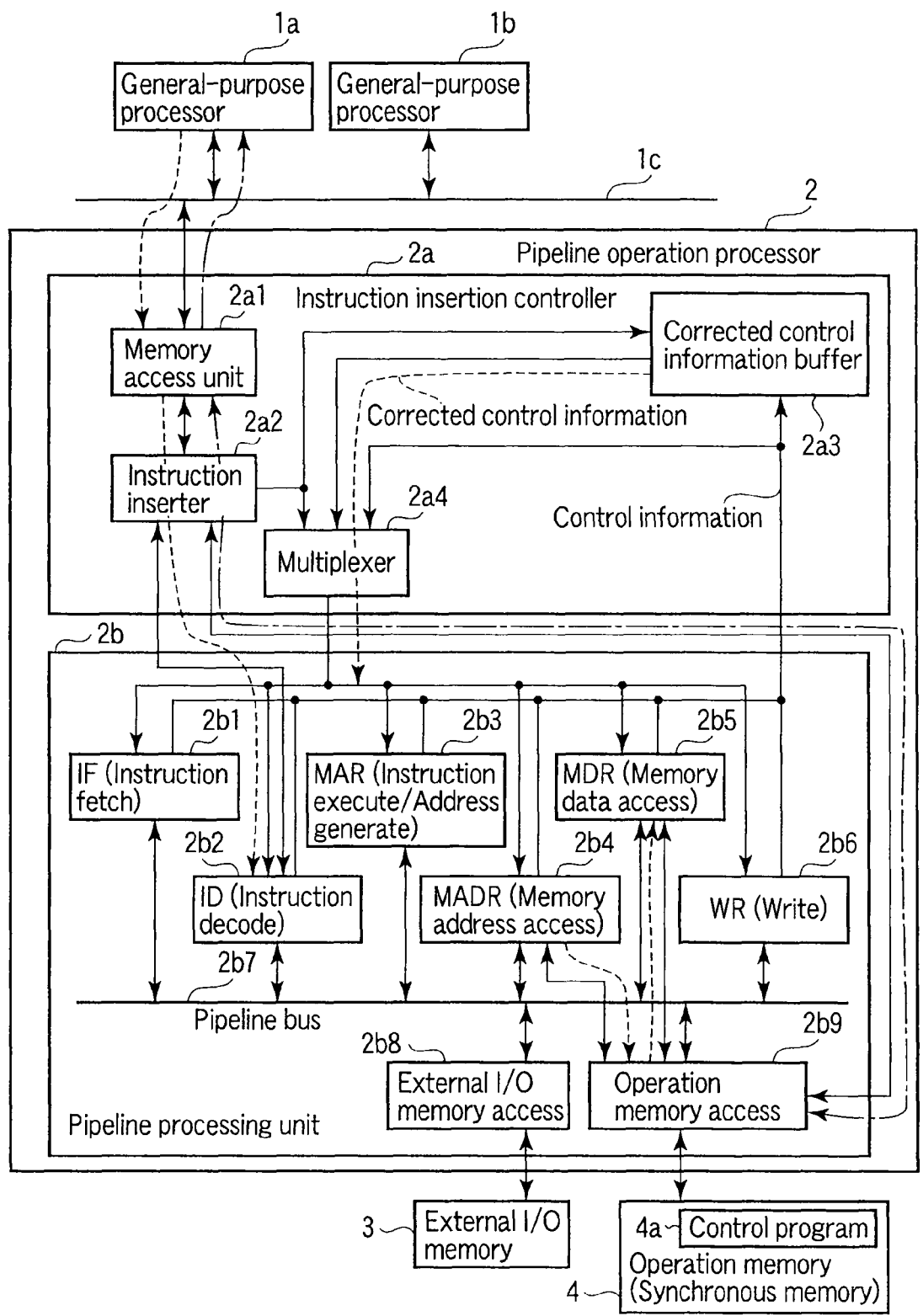
F I G. 2

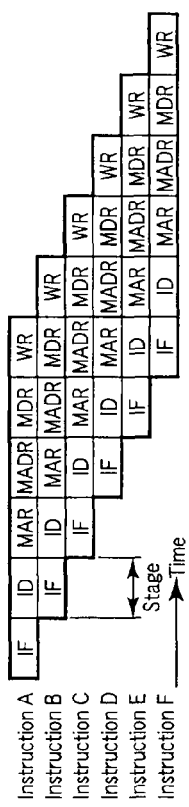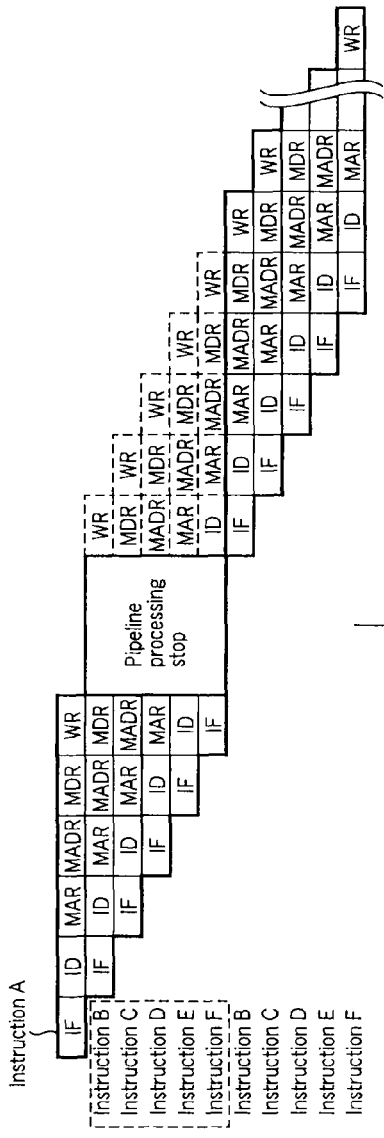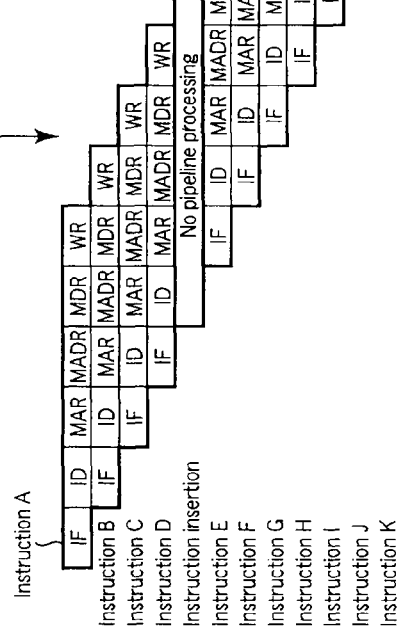
FIG. 3A
FIG. 3B

SHARING PIPELINE BY INSERTING NOP TO ACCOMMODATE MEMORY ACCESS REQUEST RECEIVED FROM OTHER PROCESSORS

CROSS-REFERENCE TO RELATED APPLICATIONS

This application is based upon and claims the benefit of priority from prior Japanese Patent Application No. 2008-213351, filed Aug. 21, 2008, the entire contents of which are incorporated herein by reference.

BACKGROUND OF THE INVENTION

1. Field of the Invention

The present invention relates to a pipeline operation processor having a pipeline processing function and to a control system comprising a shared memory which stores a program to be executed by the pipeline operation processor and operation data. More particularly, the present invention relates to a pipeline operation processor which reduces deterioration of processing efficiency in the case where another processor sharing the shared memory accesses the shared memory and to a control system comprising the pipeline operation processor.

2. Description of the Related Art

In recent years, a pipeline operation processor having a pipeline processing function has been employed to fulfill a requirement for high-speed processing of a control system.

Conventionally, a system having the configuration shown in FIG. 11 is utilized in a control system for a plant or the like. The control system includes a pipeline operation processor 12, which processes data from an external input-output (I/O) device such as a process sensor or an actuator at high speed, general-purpose processors 11a and 11b, which manage the pipeline operation processor 12 or execute different processing, an external input-output (I/O) memory 13, which functions as an interface for transferring input and output data of the external I/O device, and an operation memory 14, which stores a control program 14a to be executed by the pipeline operation processor 12 and is shared by the pipeline operation processor 12 and the general purpose processors 11a and 11b.

A pipeline processing unit 12b includes an instruction fetch unit 12b1, an instruction decoding unit 12b2, an instruction execution and address generation unit 12b3, memory access units 12b4 and 12b5, and a writing unit 12b6. The pipeline processing unit 12b further includes a bypass control circuit (not shown), which controls data paths between these units, an external I/O memory access unit 12b8, an operation memory access unit 12b9, and a pipeline bus 12b7, which connects the units of the pipeline processing unit 12b.

The pipeline processing unit 12b divides an instruction into 6 basic stages corresponding respectively to the instruction fetch unit (IF) 12b1, the instruction decoding unit (ID) 12b2, the instruction execution unit (MAR) 12b3, the memory access units (MADR, MDR) 12b4 and 12b5, and the writing unit (WR) 12b6. Thus, instructions are processed in parallel to improve throughput of the processing. When a change occurs in operation of a scheduled stage, executions of stages are suspended (or stalled) partway, restarted from the beginning, or the instruction sequence needs to be changed.

Data hazard resulting from a load instruction is one example of a cause of such a change. A method to predict an address of the load instruction for preventing a pipeline stall caused by the data hazard is disclosed, for example, in Japanese Patent No. 3435267.

The principle of pipeline processing and a technique to solve various hazards in execution of pipeline processing are disclosed, for example, in the chapter 6, pages 23-70 of "Computer Architecture and Design (Vol. 2)" written by John L. Hennessy and David A. Patterson, published by Nikkei Business Publications Inc. on Jun. 26, 1996.

FIGS. 12A and 12B show typical operations of pipeline processing by the control system of the plant or the like, which utilizes the conventional pipeline operation processor shown in FIG. 11.

For example, each of instructions A to F is processed in 6 stages as shown in FIG. 12A, and operation of each stage is synchronized with a clock signal. Executions of the respective instructions are shifted by one stage.

Conventionally, when the shared memory is accessed from the general-purpose processor 11a via a memory access unit 12a, for example, in the case where instruction B is being processed in a stage of the writing unit WR, the memory access unit 12a sends a signal to stop operations of all the stages of the pipeline processing unit 12b, as shown in FIG. 12B, and accesses the operation memory 14 via the operation memory access unit 12b9 within the period of stopping.

In such a case, the period of stopping interrupts memory cycle processing of instructions B to F, which are in operation; therefore, operation phases of stages surrounded by dotted lines in FIG. 12B are changed from an operation phase of a synchronous memory and may not be executed normally.

Therefore, instructions B to F need to be executed again after stopping the pipeline processing is cancelled as shown in FIG. 12B. Thus, the processing efficiency of the pipeline operation processor 12 is considerably reduced.

That is, performance of the processing using the conventional pipeline operation processor may deteriorate due to a disadvantage that a stage of the pipeline processing running partway is restarted from the beginning when a change occurs in a scheduled operation.

BRIEF SUMMARY OF THE INVENTION

An object of the present invention is to provide a pipeline operation processor and a control system comprising the pipeline operation processor, which can continue pipeline processing while preventing a hazard from occurring due to synchronization displacement of data paths between instructions when a shared memory is accessed, reduce deterioration of processing efficiency of the pipeline operation processor, and enable high-speed execution of a control program.

According to an embodiment of the present invention, a control system comprises:

one or more general-purpose processors;

a pipeline operation processor having a pipeline processing function and connected to a bus of the one or more general-purpose processors;

a first memory configured to store a control program executed by the pipeline operation processor and operation data, the control program and the operation data being shared by the one or more general-purpose processors and the pipeline operation processor; and a second memory configured to be accessed from the pipeline operation processor and to function as an interface for transferring external data which the pipeline operation processor inputs or outputs, the pipeline operation processor comprising:

a pipeline processing unit comprising, as stages, an instruction fetch unit, an instruction decoding unit, an instruction execution and address generation unit, a memory access unit, a writing unit to split an instruction and to execute instructions in parallel, and a pipeline bus configured to connect the stages, and an instruction access unit; and an instruction insertion controller configured to insert an instruction into the pipeline processing unit when access to the first memory is requested from the one or more general-purpose processors, and configured to correct relative displacement of control information of the stages for controlling data paths between the stages, the instruction insertion controller inserting a no-operation instruction from the instruction decoding unit in place of scheduled subsequent instruction of the control program to cause the pipeline processing unit to execute no operation, or detecting a no-operation instruction embedded in the control program by the instruction decoding unit to cause the pipeline processing unit to execute no operation, in a case where the instruction fetch unit fetches the instruction from the first memory and the control program is in execution, when an access request instruction requesting for access to the first memory is received from the one or more general-purpose processors, and the pipeline processing unit executing the subsequent instruction and continuing execution of pipeline processing without interrupting processing of the pipeline operation processor.

According to another embodiment of the present invention, a pipeline operation processor comprises:

a pipeline processing unit having a pipeline processing function for parallel processing of a control program and comprising, as stages, an instruction fetch unit, an instruction decoding unit, an instruction execution and address generation unit, a memory access unit, and a writing unit to split an instruction and to execute instructions in parallel, and a pipeline bus configured to connect the stages; and an instruction insertion controller configured to insert an instruction into the pipeline processing unit when access to a first memory is requested from a general-purpose processor, and configured to correct relative displacement of control information of the stages for controlling data paths between the stages, and the instruction insertion controller inserting a no-operation instruction from the instruction decoding unit in place of scheduled subsequent instruction of the control program to cause the pipeline processing unit to execute no operation, or detecting a no-operation instruction embedded in the control program by the instruction decoding unit to cause the pipeline processing unit to execute no operation, in a case where the instruction fetch unit fetches the instruction from the first memory and the control program is in execution, when an access request instruction requesting for access to the first memory is received from the general-purpose processor, and the pipeline processing unit executing the subsequent instruction and continuing execution of pipeline processing without interrupting processing of the pipeline operation processor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 1 is a view showing a configuration of a control system comprising a pipeline operation processor according to an embodiment of the present invention;

FIG. 2 is a view showing a configuration of the pipeline operation processor according to an embodiment of the present invention;

FIGS. 3A and 3B are views illustrating pipeline control operation examples when an operation memory (shared memory) is accessed;

DETAILED DESCRIPTION OF THE INVENTION

Figure 4:
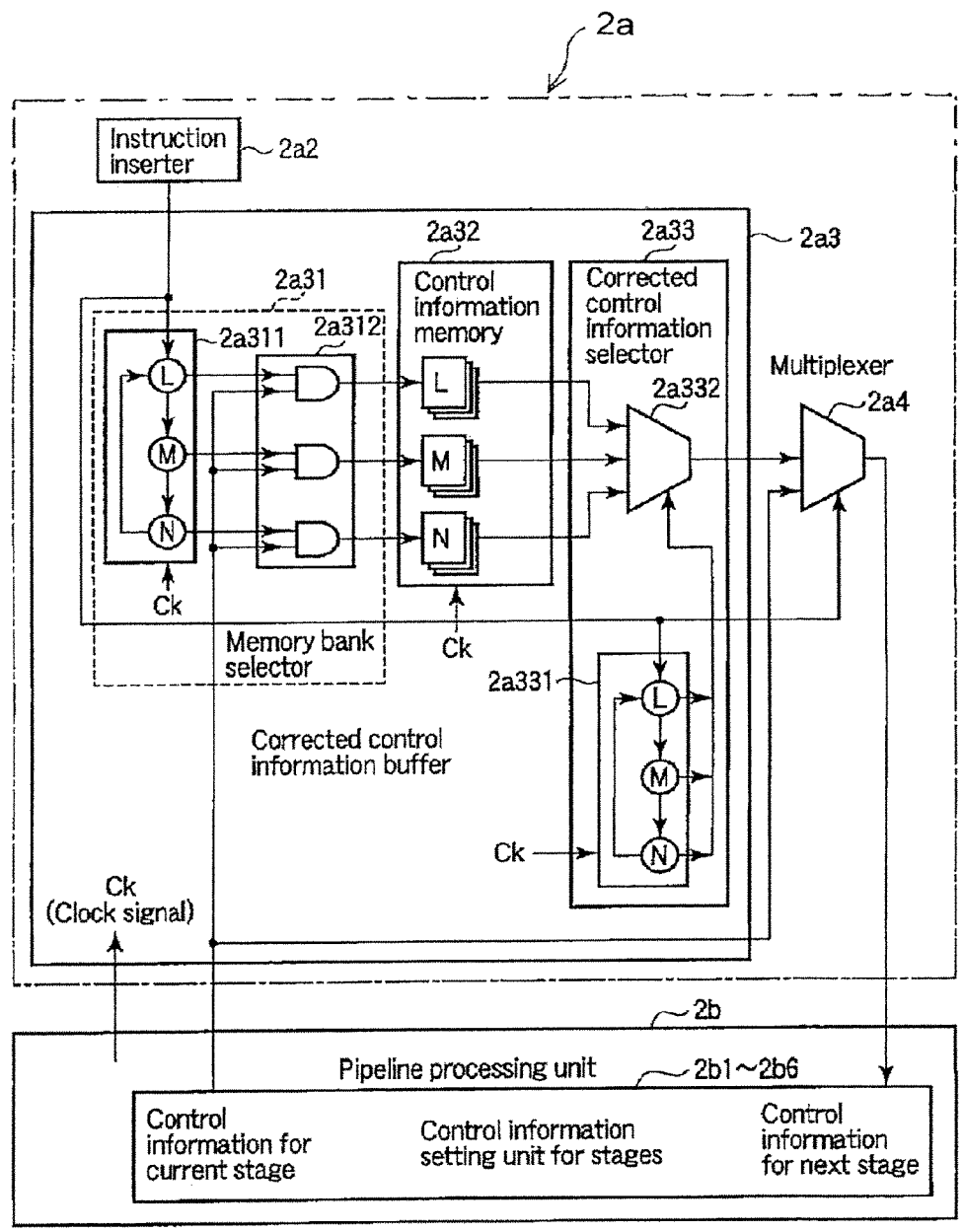
FIG. 4 is a view showing a configuration of a corrected control information buffer according to an embodiment of the present invention.

Hereinafter, embodiments of the present invention will be described with reference to the accompanying drawings.

First Embodiment

A control system comprising a pipeline operation processor according to the first embodiment of the present invention will be described hereinafter with reference to FIGS. 1 to 6. A configuration and a typical operation of the invention will be described with reference to FIGS. 1 and 3A.

The control system comprising the pipeline operation processor includes general-purpose processors 1a and 1b, a pipeline operation processor 2, which is connected to the general-purpose processors 1a and 1b via a bus 1c, an external input-output (I/O) memory 3, which stores input and output data of an input-output (I/O) device of a control target process, and an operation memory 4, which stores a control program 4a to be executed by the pipeline operation processor 2 and operation data thereof.

The pipeline operation processor 2 includes a pipeline processing unit 2b, which executes pipeline processing, and an instruction insertion controller 2a, which inserts an instruction into the pipeline processing unit 2b including a plurality of stages and corrects displacement of control information by reference to control information of stages for controlling data paths between stages.

The instruction insertion controller 2a includes a memory access unit 2a1, which controls an access request from the general-purpose processor 1a or 1b to the operation memory 4, and a instruction inserter 2a2, which inserts a no-operation (NOP) instruction into an instruction decoding unit 2b2 (to be described below) when receiving the access request from the general-purpose processor 1a or 1b to the operation memory 4.

The instruction insertion controller 2a includes a corrected control information buffer 2a3 and a multiplexer 2a4. When the instruction inserter 2a2 notifies the corrected control information buffer 2a3 about insertion of the NOP instruction, or when the instruction decoding unit 2b2 notifies the corrected control information buffer 2a3 via the instruction inserter 2a2 about insertion of an NOP instruction embedded previously in the control program, the corrected control information buffer 2a3 stores control information of the stages of the pipeline processing unit 2b at the time of the insertion, corrects relative displacement between the stored control information and control information of the stages at the time of execution of an instruction subsequent to the NOP instruction, and outputs the corrected control information. When the NOP instruction is generated, the multiplexer 2a4 changes the control information of the pipeline processing unit 2b to an output of the corrected control information buffer 2a3 and reconfigures the information.

The pipeline processing unit 2b which executes the pipeline processing includes, as the stages, an instruction fetch unit 2b1, an instruction decoding unit 2b2, an instruction execution and address generation unit 2b3, a memory address access unit 2b4, a memory data access unit 2b5 and a writing unit 2b6 to split an instruction into stages and execute instructions in parallel. The pipeline processing unit 2b further includes an input-output (I/O) memory access unit 2b8, which controls access to the I/O memory 3, an operation memory access unit 2b9, which controls access to the operation memory 4, and a pipeline bus 2b7, which connects the components of the pipeline processing unit 2b.

Furthermore, the pipeline processing unit 2b includes a pre-established control information setting unit (not shown), which bypass-controls data paths between the stages, and a control line thereof.

In the present embodiment, the pipeline processing unit 2b includes 6 units from the information fetch unit 2b1 to the writing unit 2b6 in correspondence with 6 stages of an instruction. However, the configuration of the pipeline processing unit 2b may correspond to 5 stages or 8 stages. The pipeline processing unit 2b is only required to have the pipeline processing function. The number of stages is not limited to 6.

The I/O memory 3 functions as an interface for transferring input and output data associated with the operation of the pipeline operation processor 2. The output data is written from the memory address access unit 2b4 through the pipeline bus 2b7 and the I/O memory access unit 2b8 to the I/O memory 3 at a preset basic bus cycle of the pipeline bus 2b7.

Conversely, the input data is read from the I/O memory 3 and sent to the memory data access unit 2b5 through the I/O memory access unit 2b8.

The operation memory 4 includes a synchronous memory, and data is written from the memory address access unit 2b4 through the operation memory access unit 2b9 to the operation memory 4.

Conversely, data is read from the operation memory 4 in synchronization with a clock signal of the pipeline bus 2b7 and sent to the memory data access unit 2b5 via the operation memory access unit 2b9.

Next, a typical control operation of the control system configured as above will be described for the case where typical pipeline processing is in execution. As indicated by dotted arrows in FIG. 1, the control program 4a executed by the pipeline operation processor 2 causes the instruction fetch unit 2b1 to make a request for an instruction via the pipeline bus 2b7, the operation memory access unit 2b9 accesses the operation memory 4, and the instruction to be executed is sent to the instruction decoding unit 2b2.

Symbols IF to WR in FIG. 3A respectively represent stages of the pipeline processing each of which corresponds to each of the stages (including the instruction fetch unit 2b1 to the writing unit 2b6). For example, read instructions A to F are processed in parallel, each of the instructions is processed in 6 stages, and executions of the instructions are shifted by one stage.

Next, an explanation will be given with reference to FIGS. 2 and 3B about an operation for when access from the general-purpose processor 1a or 1b to the operation memory 4 is requested in the case where the pipeline operation processor 2 is executing the typical control operation.

As indicated by dotted lines in FIG. 2, when access to the operation memory 4 is requested from the general-purpose processor 1a via the memory access unit 2a1, the instruction inserter 2a2 inserts an NOP instruction into the instruction decoding unit 2b2 in place of instruction E, which is scheduled to be executed, as shown in FIG. 3B, and the units of the stages do not execute any processing during a period of the NOP instruction.

The instruction inserter 2a2 writes or reads request data to or from the operation memory 4 via the operation memory access unit 2b9 within the period of the NOP instruction, as indicated by chain lines in FIG. 2.

The lower portion of FIG. 3B shows an operation of the pipeline operation processor 2 for when an NOP instruction is inserted between instructions D and E in the case where the general-purpose processor 1a makes a request for access to the operation memory 4. For the sake of comparison, the upper portion of FIG. 3B shows a conventional operation that stops all stages of the processing.

As shown, when one NOP instruction is inserted and the pipeline processing proceeds, instructions B to F, which have been in execution, need not be fully stopped and re-executed, and delay in processing is limited to one stage caused by the insertion of the NOP instruction, in comparison with the conventional case where all stages are stopped. Therefore, continuity of the pipeline processing is ensured and deterioration of processing efficiency due to an access request to the shared memory can be reduced.

Furthermore, access to the operation memory 4 may be embedded in the control program, and the pipeline operation processor 2 may execute the access. In such a case, when insertion of an NOP instruction from the instruction inserter 2a is notified, the instruction decoding unit 2b2 detects the NOP instruction, which is preliminarily embedded in the control program, and notifies the instruction inserter 2a2. The instruction inserter 2a2 notifies the corrected control information buffer 2a3 about the generation of the NOP instruction.

After the notification of the NOP instruction is made, the corrected control information buffer 2a3 operates similarly to the case in which the general-purpose processor 1a makes an access request to the operation memory 4.

Next, with reference to FIG. 2 and FIGS. 4 to 6, a configuration and an operation of the instruction insertion controller 2a will be described in detail.

Figure 5A:
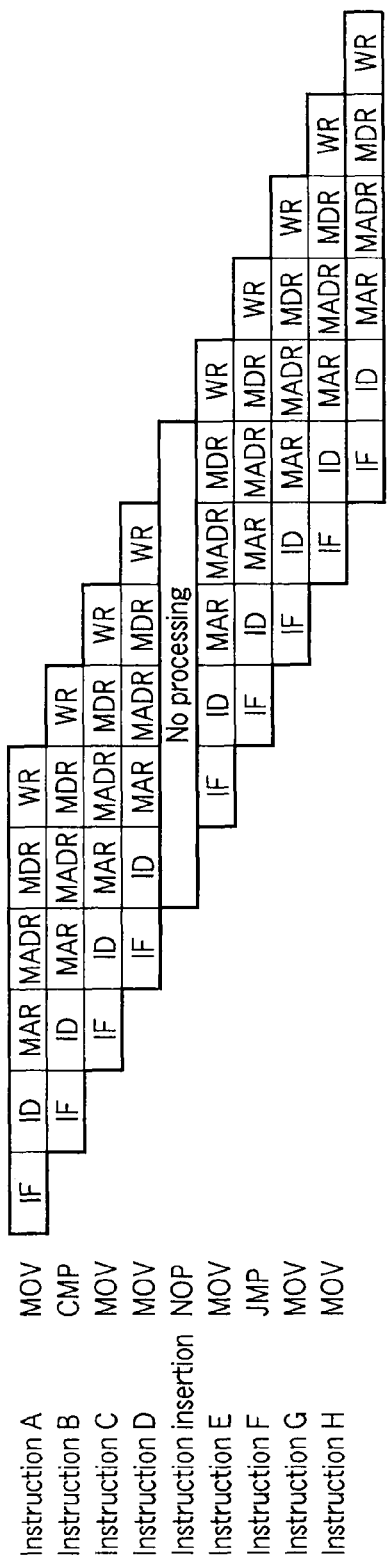
FIGS. 5A and 5B are views illustrating pipeline control operation examples of the corrected control information buffer.
Figure 5B:
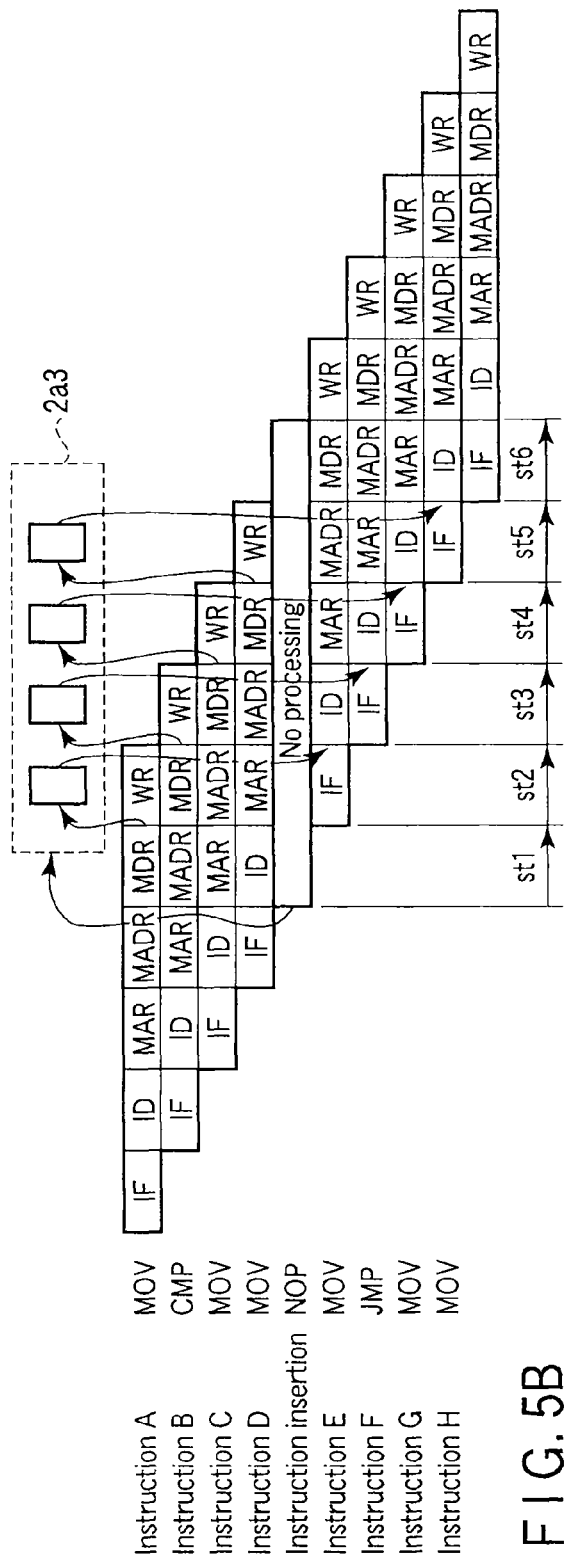

When the instruction inserter 2a2 inserts an NOP instruction from the ID decoding unit 2b2 in place of instruction E which is scheduled to be executed, relative position between stages of the instruction before the inserted NOP instruction and stages of the instruction behind the insertion is changed as shown in FIG. 5B, namely, a phase relationship of control information which controls a dependence relationship between stages is changed.

Therefore, when the instruction is inserted, a phase of the control information that controls a data path between stages is required to be corrected. The corrected control information buffer 2a3 corrects the displacement of the control information. Details of the corrected control information buffer 2a3 will be described with reference to FIG. 4.

The corrected control information buffer 2a3 includes a memory bank selector 2a31, which selects a bank for storing the control information each time the instruction inserter 2a2 inserts the NOP instruction into the instruction decoding unit 2b2, a control information memory 2a32, which includes banks containing a plurality of buffer registers for storing the control information, and a corrected control information selector 2a33, which corrects, at the time of execution of an instruction subsequent to the NOP instruction, relative displacement of the control information between stages caused by the insertion of the NOP instruction and selects and outputs the corrected information from a corresponding bank.

The memory bank selector 2a31 includes input-select ring buffer unit 2a311 and a gate circuit 2a312. The input-select ring buffer unit 2a311 includes 3 buffers that store presence or absence of instruction insertion from the instruction inserter 2a2, rotate in synchronization with the clock signal Ck of the pipeline, and stop during a period for which an output from the instruction inserter 2a2 exists, and high-level outputs of which are considered as "true". When the input-select ring buffer unit 2a311 outputs true, the gate circuit 2a312 receives inputting control information of stages of the pipeline processing unit 2b and transmits an output from any of the ring buffers which is true to a corresponding bank.

The corrected control information selector 2a33 includes an output-select ring buffer unit 2a331 and a multiplexer 2a332. The output-select ring buffer unit 2a331 controls the control information memory 2a32 to delay outputting the control information stored in banks of the control information memory 2a32 for a period corresponding to the number of inserted instructions, i.e., for a period corresponding to stopped stages. The multiplexer 2a332 inputs the control information stored in one of the three banks (L, M, N) of the control information memory 2a32, and outputs the control information selected in accordance with the output from the output-select ring buffer unit 2a331.

The number of buffers of the input-select ring buffer unit 2a311, the number of buffers of the output-select ring buffer unit 2a331, and the number of banks of the control information memory 2a32 are preliminarily determined based on the number of processors accessing the shared operation memory 4 and the number of times of accessing per stages in one instruction of the pipeline processing. Thus configured synchronous primary memory allows correction of control information at high-speed and in synchronization with the clock signal of the pipeline processing.

Next, a control operation of the corrected control information buffer 2a3 configured as above will be described.

For example, when a operation result of the stage of the memory data access (MDR) unit 2b5 is used in the stage of the instruction decoding (ID) unit 2b2, the typical pipeline processing can operate in such a manner that the control information of the memory data access (MDR) unit 2b5 according to instruction A is referenced by the stage of the instruction decoding (ID) unit 2b2. However, in the case where a request for access to the operation memory 4 is generated, when the control information of the MDR stage (st1) is referred as is in the ID stage (st3) after the insertion of the NOP instruction, proper control information is updated by a subsequently executed instruction to cause a hazard, and the proper control information cannot be used.

Thus, the corrected control information buffer 2a3 temporarily stores the proper control information so that the control information can be referred in the ID stage.

That is, in order to sequentially store control information of sequential stages in the pipeline processing operation and to make the control information can be referenced, the corrected control information buffer 2a3 includes, as described above, the control information memory 2a32 including banks configured in parallel with respect to the input of the control information, and includes the memory bank selector 2a31 and the corrected control information selector 2a33 which select and control an input condition or an output condition of the control information based on selection of any of the parallel banks and a selection condition rotating in synchronization with the clock signal Ck. The corrected control information buffer 2a3 corrects phase displacement of the control information at the time of the instruction insertion in synchronization with the clock signal, and makes the corrected control information can be referred in stages of the pipeline; therefore, even when access requests of a plurality of instructions are generated, the control information can be referred normally.

Figure 6:
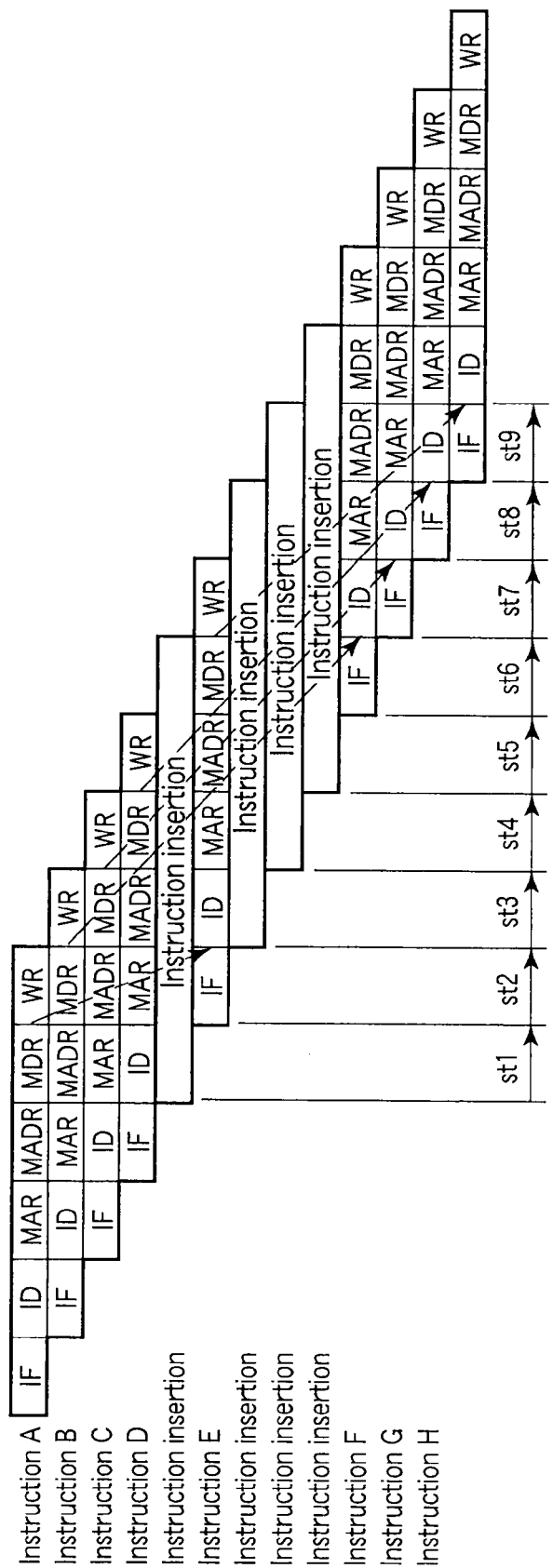
FIG. 6 is a view illustrating another pipeline control operation example of the corrected control information buffer.

For example, as shown in FIG. 6, in the case where instruction B is a comparison instruction of which mnemonic notation is CMP and instruction F is a condition branching instruction which is expressed as JMP and instruction F refers control information resulting from instruction B, when an NOP instruction is inserted between instructions D and E, and 3 NOP instructions are sequentially inserted between instructions E and F, control information for the stage of ID derived from the stage of MDR is properly set in each of stage st3 and stages st6 to st9 as indicated by arrows, namely, the control information of a proper phase corresponding to the case where the NOP instructions are not inserted is set and the processing operates normally.

Second Embodiment

Hereinafter, a control system comprising a pipeline operation processor according to the second embodiment of the present invention will be described with reference to FIGS. 7 and 8.

The same portions as those of the first embodiment will be indicated in the same reference numerals and their detailed description will be omitted.

In the second embodiment, pipeline processing is simplified by regularizing that memory access to the operation memory 4 is executed once with respect to each instruction.

In general, when accessing an address on a memory map, a processor which handles fixed-length data in specific complies with alignment corresponding to an integral multiple of an even byte. The processor complies with 4-byte alignment for handling 32-bit data and with 2-byte alignment for handling 16-bit data. Furthermore, failure to comply means an alignment error.

Figure 7:
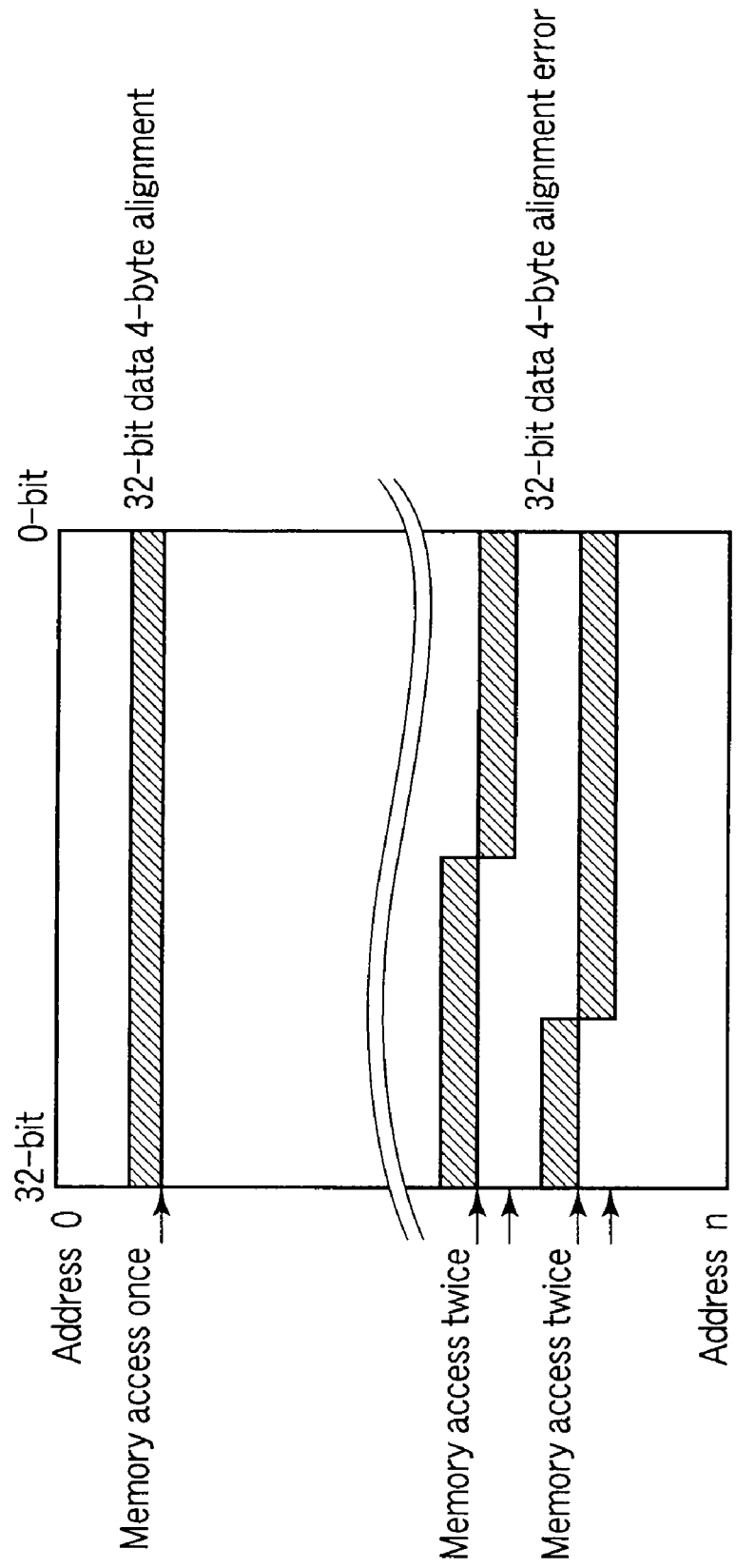
FIG. 7 is a view illustrating an alignment error.

In such a case, as shown in FIG. 7, alignment data of 4-byte can be written or read per memory access. However, if data results in an alignment error which requires memory access twice, it is required that the same instruction insertion and control information are stored to enable a plurality of times of memory access and normal pipeline processing is enabled without causing a hazard of control information due to the plurality of times of memory access.

Figure 8:
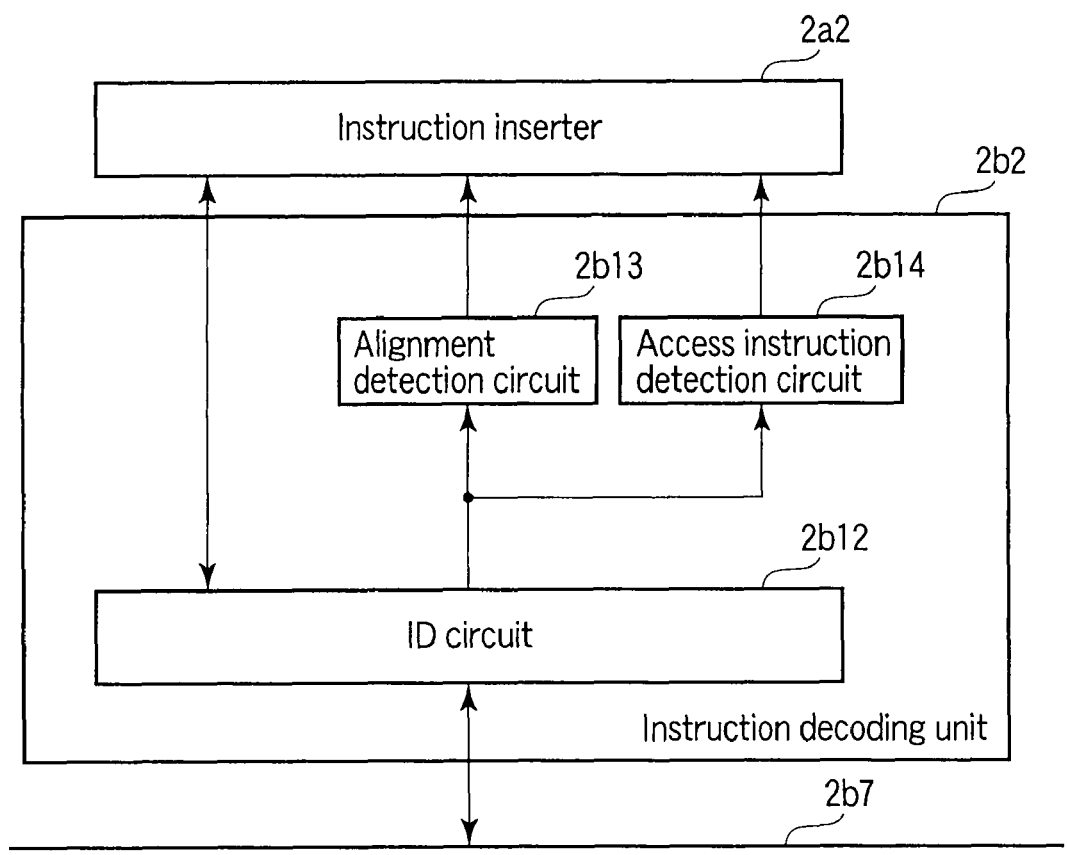
FIG. 8 is a view illustrating detection of the alignment error and an operation of an instruction insertion controller.

Consequently, as shown in FIG. 8, in the instruction decoding unit 2b2, an ID circuit 2b12 extracts an instruction to access the operation memory 4 and a memory address and a data size of the instruction, and an alignment detection circuit 2b13 detects an alignment error and transmits resulting detection signal to the instruction inserter 2a2. Thus, by means of the instruction insertion controller 2a, the pipeline operation processor 2 can properly execute memory access twice per one instruction, similarly to the first embodiment.

Accordingly, memory access for data which may result in an alignment error need not prevented by compiling of the control program but can be executed by the pipeline operation processor. Memory access even for variable-length data comes to be executable by the pipeline operation processor for executing a fixed-length instruction; therefore, the processing by the pipeline operation processor becomes faster.

Third Embodiment

Hereinafter, a control system comprising a pipeline operation processor according to the third embodiment of the present invention will be described with reference to FIGS. 8 to 10.

The same portions as those of the first embodiment will be indicated in the same reference numerals and their detailed description will be omitted.

In the third embodiment, access from the pipeline operation processor 2 to the I/O memory 3 for a plurality of instructions can be made by one instruction to improve operation efficiency.

The instruction decoding unit 2b2 includes an access instruction detection circuit 2b14 shown in FIG. 8. The access instruction detection circuit 214 detects an instruction, which is set in an ID circuit 2b12, to access the I/O memory 3 of the pipeline operation processor 2 a plurality of times. On detecting the instruction of the access request, the access instruction detection circuit 2b14 notifies the instruction inserter 2a2 about the instruction, the instruction inserter 2a2 notifies the ID circuit 2b12 about execution of the instruction, and memory access corresponding to the plurality of times of the instruction insertion is executed through the I/O memory access unit 2b8 until the memory access is completed.

Figure 9:
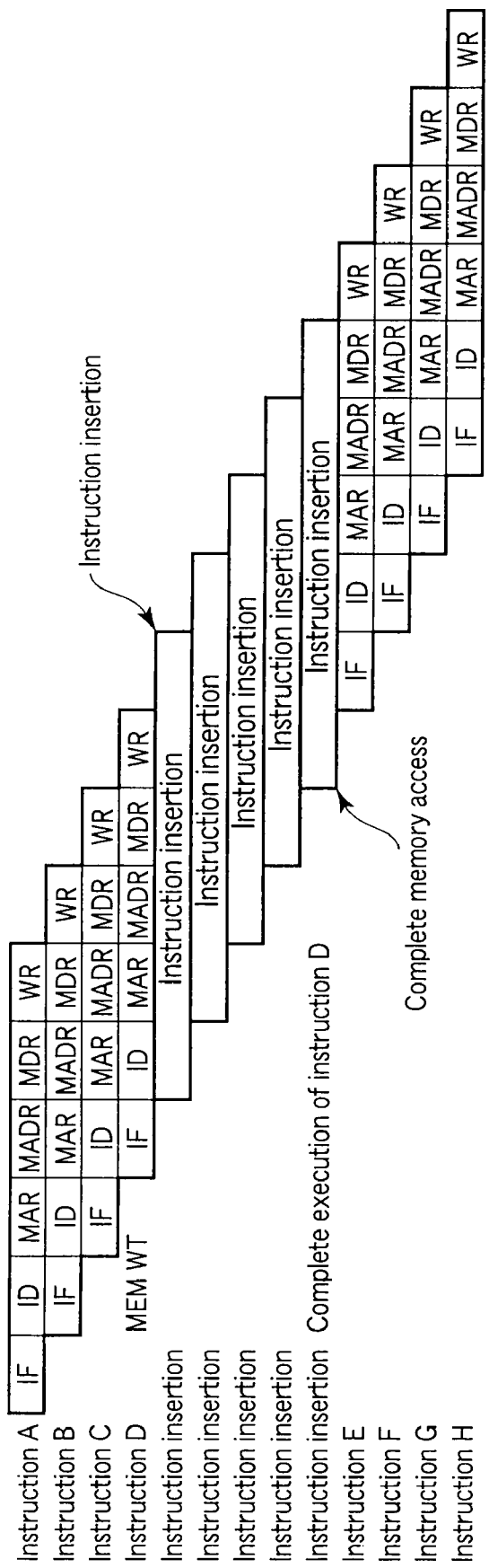
FIG. 9 is a view illustrating an operation example of the instruction insertion controller when one instruction causes execution of a plurality of instructions.

For example, in FIG. 9, an instruction D is a write access instruction of which mnemonic notation is MEM WR and a plurality of instructions are inserted between execution of an instruction D and completion of the memory access.

In preparation for the case in which write data resulting from execution of instructions A to C before instruction D is transferred directly to an MADR stage, insertion of the plurality of instructions is executed subsequently to execution of instruction D until the memory access is completed. Therefore, direct transfer of write data between stages does not generate a data hazard and memory access to the operation memory 4 is enabled.

Figure 10:
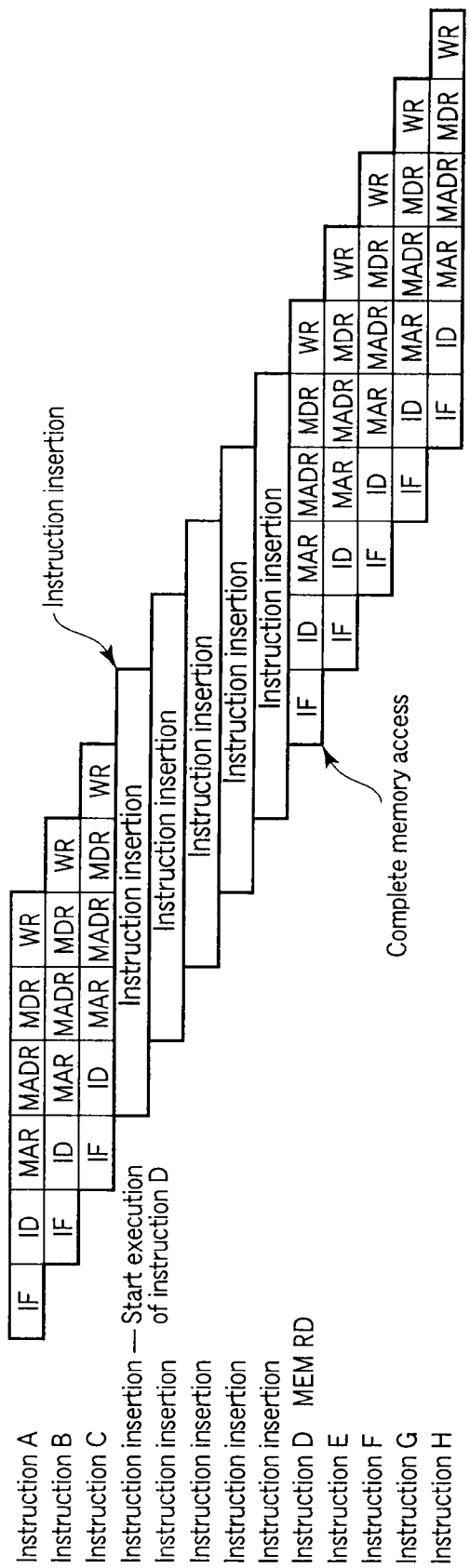
FIG. 10 is a view illustrating another operation example of the instruction insertion controller when one instruction causes execution of a plurality of instructions.
Figure 11:
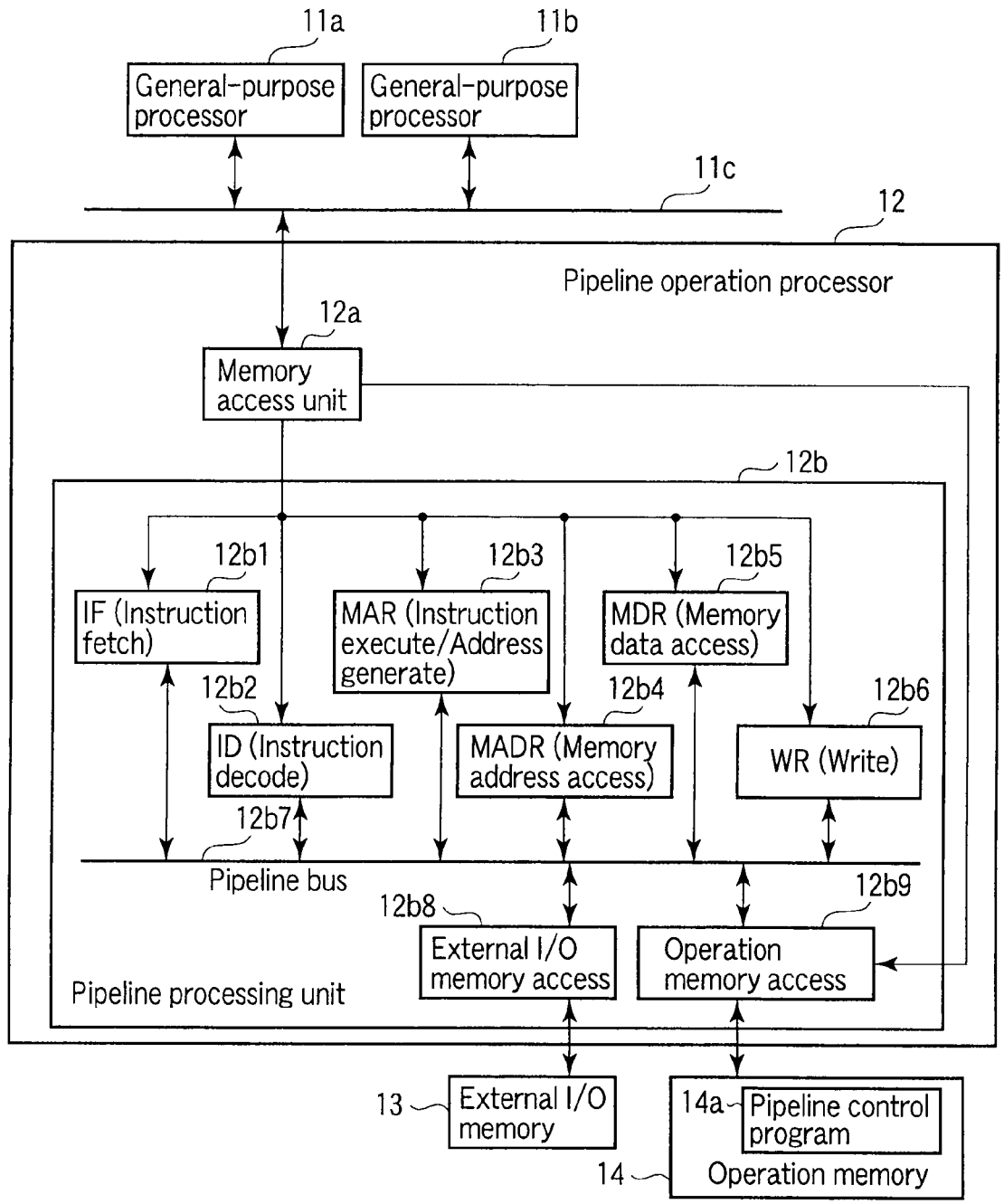
FIG. 11 is a view showing a configuration of a control system comprising a conventional pipeline operation processor.
Figure 12A:
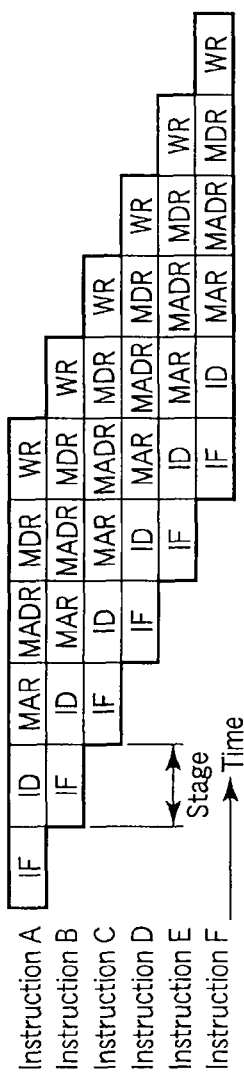
FIGS. 12A and 12B are views illustrating an operation accessing to a shared memory of the control system comprising the conventional pipeline operation processor.
Figure 12B:
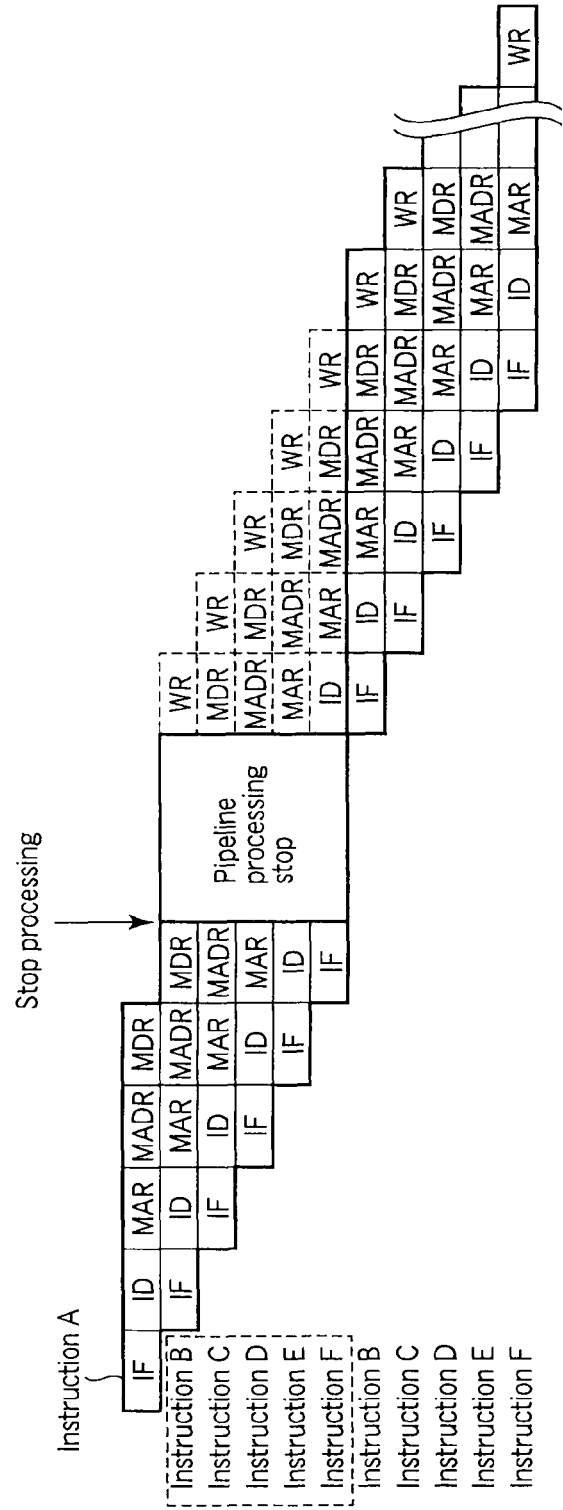

In FIG. 10, an instruction D is a read access instruction of which mnemonic notation is MEM RD and the plurality of instructions are inserted subsequently to execution of an instruction C and at the time of starting execution of instruction D. Completion of the memory access causes execution of instruction D, that is, MEM RD.

In preparation for the case in which execution instructions E to H behind instruction D utilizes read data directly transferred from an MDR stage, the plurality of instructions are inserted from the start of execution of instruction D until just before the completion of the memory access and instruction D is subsequently executed. Therefore, direct transfer of read data between stages does not generate a data hazard and memory access is enabled.

According to the third embodiment, memory access from a general-purpose processor is enabled minimizing effects on pipeline control for a pipeline operation processor, and operation performance of the pipeline operation processor can be improved.

The present invention is not limited to the above described embodiments. The instruction insertion controller is only required to insert an NOP instruction into a shared operation memory and to correct displacement of control information (generation of a hazard) generated at the time of the insertion. A stage configuration of the pipeline processing unit and a circuit configuration of the operation memory can be variously modified without departing from the spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control system comprising:
   one or more general-purpose processors;
   a pipeline operation processor having a pipeline processing function and connected to a bus of the one or more general-purpose processors;
   an operation memory configured to store a control program executed by the pipeline operation processor and operation data, and to be accessed from the one or more general-purpose processors via the pipeline operation processor; and
   an external input-output (I/O) memory configured to be accessed from the pipeline operation processor and to function as an interface for transferring external data which the pipeline operation processor inputs or outputs,
   the pipeline operation processor including:
   a pipeline processing unit having, as stages, an instruction fetch unit, an instruction decoding unit, an instruction execution and address generation unit, a memory access unit, a writing unit to split an instruction and to execute instructions in parallel,
   an operation memory access unit configured to control an input-output (I/O) memory access unit and access the operation memory, the input-output (I/O) memory access unit controlling access to the input-output I/O memory,
   a pipeline bus configured to connect the stages, an instruction access unit and the operation memory access unit, and
   an instruction insertion controller including:
   an instruction access unit configured to receive an access request instruction from the one or more general-purpose processors and transmit the access request instruction;
   an instruction inserter configured to insert a no-operation instruction into the instruction decoding unit when receiving the access request instruction from the instruction access unit;
   a corrected control information buffer configured to store control information of the stages of the pipeline processing unit at a time of inserting the no-operation instruction, to correct relative displacement between the control information stored in the corrected control information buffer and control information of the stages at the time of executing an instruction subsequent to the no-operation instruction, and to output the corrected control information when insertion of the no-operation instruction is notified from the instruction inserter, or when the no-operation instruction embedded in the control program is notified from the instruction decoding unit via the instruction inserter; and a first multiplexer configured to change the control information of the pipeline processing unit to an output of the corrected control information buffer and to reconfigure the control information, when the no-operation instruction is generated, the instruction insertion controller inserting a no-operation instruction from the instruction decoding unit in place of a scheduled subsequent instruction of the control program to cause the pipeline processing unit to execute no operation, in a case where the instruction fetch unit fetches the instruction from the operation memory, and the control program is in execution, when an access request instruction requesting for access to the operation memory is received from the one or more general-purpose processors, the pipeline processing unit executing the subsequent instruction and continuing execution of pipeline processing without interrupting processing of the pipeline operation processor.

2. The control system according to claim 1, wherein the corrected control information buffer includes:

a control information memory having banks for storing the control information;

a memory bank selector configured to select one of the banks for storing the control information each time the no-operation instruction is inserted;

a corrected control information selector configured to correct relative displacement of the control information stored in each of the banks between the stages caused by inserting the no-operation instruction, to reconfigure corrected control information at a time of executing an instruction subsequent to the no-operation instruction, and to select and output the corrected control information from a corresponding bank; and a second multiplexer configured to select one of an output from the corrected control information selector and the control information before insertion of the no-operation instruction.

3. The control system according to claim 1, wherein the instruction decoding unit comprises:

an ID circuit configured to store instruction code of the instruction fetched by the instruction fetch unit and an address of the instruction; and an alignment error detection circuit configured to detect presence or absence of an alignment error based on the instruction code and the address stored in the ID circuit, when the alignment error detection circuit detects the alignment error, the instruction inserter is notified about the presence or absence of the alignment error, and the instruction inserter notifies the ID circuit about insertion of the instruction code corresponding to the presence or absence of the alignment error to execute access to the operation memory based on the presence or absence of the alignment error.

4. The control system according to claim 1, wherein the instruction decoding unit includes:

an ID circuit configured to store instruction code of the instruction fetched by the instruction fetch unit; and an access instruction detection circuit configured to detect a request instruction for accessing the external input-output (I/O) memory a plurality of times based on the instruction code stored in the ID circuit, when the access instruction detection circuit detects the request instruction for accessing the plurality of times, the instruction inserter is notified about a number of times of access, and the instruction inserter notifies the ID circuit about insertion of the instruction code corresponding to the number of times to execute accessing the external input-output (I/O) memory the plurality of times.

5. A pipeline operation processor comprising:

a pipeline processing unit having a pipeline processing function for parallel processing of a control program and having, as stages, an instruction fetch unit, an instruction decoding unit, an instruction execution and address generation unit, a memory access unit, a writing unit to split an instruction and to execute instructions in parallel;

an operation memory access unit configured to control an input-output (I/O) memory access unit and access an operation memory, the input-output (I/O) memory access unit controlling access to the input-output I/O memory;

a pipeline bus configured to connect the stages, the instruction access unit and the operation memory access unit; and an instruction insertion controller including:

an instruction access unit configured to receive the access request instruction from one or more general-purpose processors and transmit the access request instruction;

an instruction inserter configured to insert a no-operation instruction into the instruction decoding unit when receiving the access request instruction from the instruction access unit;

a corrected control information buffer configured to store control information of the stages of the pipeline processing unit at a time of inserting the no-operation instruction, to correct relative displacement between the control information stored in the corrected control information buffer and control information of the stages at the time of executing an instruction subsequent to the no-operation instruction when insertion of the no-operation instruction is notified from the instruction inserter, and to output the corrected control information when insertion of the no-operation instruction is notified from the instruction inserter, or when the no-operation instruction embedded in the control program is notified from the instruction decoding unit via the instruction inserter; and a first multiplexer configured to change the control information of the pipeline processing unit to an output of the corrected control information buffer and to reconfigure the control information, when the no-operation instruction is generated, the instruction insertion controller inserting a no-operation instruction from the instruction decoding unit in place of a scheduled subsequent instruction of the control program to cause the pipeline processing unit to execute no operation, in a case where the instruction fetch unit fetches the instruction from the operation memory, and the control program is in execution, when an access request instruction requesting for access to the operation memory is received from the general-purpose processors, the pipeline processing unit executing the subsequent instruction and continuing execution of pipeline processing without interrupting processing of the pipeline operation processor.

6. The pipeline operation processor according to claim 5, wherein the corrected control information buffer includes:

a control information memory having banks for storing the control information;

a memory bank selector configured to select one of the banks for storing the control information each time the no-operation instruction is inserted;

a corrected control information selector configured to correct, at a time of executing the subsequent instruction, relative displacement of the control information stored in each of the banks between the stages caused by inserting the no-operation instruction, to select and output corrected control information from a corresponding bank; and a second multiplexer configured to select one of an output from the corrected control information selector and the control information before insertion of the no-operation instruction.

7. The pipeline operation processor according to claim 5, wherein the instruction decoding unit includes:

an ID circuit configured to store instruction code of the instruction fetched by the instruction fetch unit and an address of the instruction; and an alignment error detection circuit configured to detect presence or absence of an alignment error based on the instruction code and the address stored in the ID circuit, when the alignment error detection circuit detects the alignment error, the instruction inserter is notified about the presence or absence of the alignment error, and the instruction inserter notifies the ID circuit about insertion of the instruction code corresponding to the presence or absence of the alignment error to execute access to the operation memory based on the presence or absence of the alignment error.

8. The pipeline operation processor according to claim 5, wherein the instruction decoding unit includes:

an ID circuit configured to store instruction code of the instruction fetched by the instruction fetch unit; and an access instruction detection circuit configured to detect a request instruction for accessing a external input-output (I/O) memory a plurality of times based on the instruction code stored in the ID circuit, when the access instruction detection circuit detects the request instruction for accessing the plurality of times, the instruction inserter is notified about a number of times of access, and the instruction inserter notifies the ID circuit about insertion of the instruction code corresponding to the number of times to execute accessing the external input-output (I/O) memory the plurality of times.

* * * * *